Oct. 27, 1970

G. GRAY ET AL 3,535,790

SATELLITE TRACKING CALCULATOR

Filed Aug. 23, 1968

GARY GRAY
JAMES C. FRAUTNICK
WILLIAM J. GLEESON
INVENTORS

BY *Howard J. Murray Jr.* AGENT

*G. Baxter Warner*
ATTORNEY

Oct. 27, 1970 — G. GRAY ET AL — 3,535,790
SATELLITE TRACKING CALCULATOR
Filed Aug. 23, 1968 — 4 Sheets-Sheet 3

United States Patent Office
3,535,790
Patented Oct. 27, 1970

3,535,790
SATELLITE TRACKING CALCULATOR
Gary Gray, 2064 Sweetland Ave., Oxnard, Calif. 93030; James C. Frautnick, 560 Laurie Lane, Thousand Oaks, Calif. 91360; and William J. Gleeson, 343 W. Highland Drive, Camarillo, Calif. 93010
Filed Aug. 23, 1968, Ser. No. 754,863
Int. Cl. G01c 21/00, 21/24
U.S. Cl. 33—1    5 Claims

ABSTRACT OF THE DISCLOSURE

A hand-operated calculating device which can be employed by personnel located at any point on the earth's surface in order to determine in advance whether or not a particular communications satellite is "usable" at such point for the purpose of obtaining a precise navigational fix under all weather conditions.

---

The invention described herein may be manufactured and used by or for the Government of the United States of America for governmental purposes without the payment of any royalties thereon or therefor.

BACKGROUND OF THE INVENTION

A number of artificial satellites are now in orbit around the earth. Certain of these satellites form part of a system specifically established for the purpose of enabling a station to ascertain its exact geographical position, at any time and under all weather conditions, by utilizing information transmitted from the satellite while passing over that portion of the earth's surface where the station is located. The system is based upon the principle that signals transmitted from the satellite undergo a so-called Doppler shift, and, if the orbit of the satellite is known, measurement of this Doppler shift can be utilized to determine the exact position on earth of any point at which such signals are received.

Briefly summarized, communications satellites placed in circular polar orbits at from 450 to 700 miles altitude circle the earth at a tangential velocity of about 5 miles per second. Stable oscillator frequencies radiated therefrom are received higher than transmitted (if the satellite is approaching the receiver) due to the velocity of the approaching satellite, producing accordian-like compression effects that squeeze the radio signals as the intervening distance shortens. As the satellite nears its point of closest approach, these compression effects lessen rapidly, until, at the moment of closest approach, the cycle count of the received frequencies exactly matches that which is generated. As the satellite passes beyond this point and travels away from the receiver, expansion effects cause the received frequencies to drop below the generated frequencies in ratio to the widening distance and the speed of the receding satellite. Consequently, the time of zero Doppler is the time of closest approach of the satellite to the receiver, and the slope of the curve plotted from the received signals at that time is a measurement of the slant range from the receiver to the satellite. Measurement of the Doppler shift against an offset frequency is a critical factor in an equation that establishes position on earth in relation to a satellite of known orbit. At a given instant, that particular curve can be acquired at only one point on earth in relation to that satellite. As a result, given the orbital parameters of a satellite (and each satellite is constantly telling where it is at the time) and the shift of a Doppler signal transmitted from the satellite, it is possible to obtain a navigational fix whenever and wherever the satellite passes in radio line-of-sight. No optical sighting is necessary, no attitude stabilization, and no reference to true north. No angles such as are used by a sextant need be measured. All that is required is apparatus to receive and process continuous-wave, phase-modulated signals from the satellite in order to compute a precise navigation fix.

A number of different types of navigation receiving systems are now in use to measure the Doppler shift in the received satellite signal in order to yield this positional information. One of these, employed mostly in undersea craft, is extremely complex and highly automated to meet exacting interface and environmental requirements. It is completely automatic, computing its own "alerts," listing the times at which systems satellites will pass within radio range of the vehicle position, activating itself when a satellite approaches, receiving the data, computing a fix, and typing out the result for inspection by vehicle personnel. However, use of such a system can obviously be justified only on those particular vehicles for which a highly sophisticated positioning system is essential.

On the other hand, a much simpler system is also in use where operational requirements are less severe. The latter system is not required to meet the precise navigational requirements of the type first discussed, nor the need for sub-surface acquisition nor instantaneous interface with other navigation or precision-guidance weapons systems. However, except for receiving satellite signals and computing the fix, the other operations performed automatically in the first-discussed system are instead accomplished manually by the navigator on the vehicle utilizing the less sophisticated equipment. At least three broadcasts from the satellite are required to yield a navigation fix when the latter system is employed.

The ground equipment that operates the navigation satellites and keeps them supplied with information on a daily basis is in the form of a network of operational injection facilities and tracking stations connected to a centralized control center. Normally, two or more system satellites circle the earth in near-polar orbits, broadcasting from space successive two-minute data readouts from their memories in the form of phase-modulation superimposed on two carrier frequencies. When the system satellites are first launched, they transmit two rigorously-coherent radio frequencies. The memory information (consisting essentially of data containing time signals and corresponding sets of coordinates progressively describing the orbital whereabouts of each satellite) must be provided later and kept current. The ground network has the duty of compiling this data and relaying it to the satellites in more or less continuous fashion. Thus the carrier frequencies broadcast by the satellites and the data they carry are constantly updated.

From the above discussion of the navigation satellite system, it will be apparent that knowledge as to when an orbiting satellite will be in the region of a particular ground station so as to be "usable" at that station is of prime importance. In other words, means must be provided for enabling a potential user to accurately ascertain the future time, position and areas covered by any particular satellite. The present invention is directed to the provision of a simple hand-operated instrument that may be used by personnel at a given point or station to predict, in conjunction with a transmitted message, a series of satellite alerts, or, in other words, whether or not a particular satellite pass is navigable. The data obtainable by using the device of the present invention includes the time of satellite closest approach, and, since the rise time of the satellite is approximately 8 minutes before such time of closest approach, the period within which the satellite is within radio line-of-sight of any particular station is also calculable.

SUMMARY OF THE INVENTION

The present concept relates to a hand-operated calculating device consisting of a rotatable disc having imprinted thereon a communications satellite ground track together with a pair of boundary lines defining a band or swath generally bisected by this ground track and representing an area of the earth's surface within which the satellite is within radio line-of-sight at time of closest approach to any given point or station. Overlying one face of this rotatable disc is a transparent cover having marked thereon an azimuthal equidistant polar projection of the northern hemisphere.

On the reverse side of the rotatable disc is a similar ground track and associated band or swath representative of the ground track and area coverage for the remaining half of a complete orbit of the communications satellite. Superimposed upon this reverse side of the movable disc is a further transparent cover having marked thereon an azimuthal equidistant polar projection of the southern hemisphere. The axis of rotation of the movable disc coincides with the north and south poles of the equatorial projections printed upon the transparent covers. The calculating device, when used in conjunction with information as to the time and nodal crossing of a communications satellite, yields data concerning that portion of the earth's surface effectively covered by the satellite during one complete revolution thereof. By employing an ephemeris (which is a table of calculated satellite closest approach times with ascending node longitudes as arguments) the future time position and areas covered by the satellite can accurately be determined. From this information it will instantly be apparent whether or not any particular passage of the satellite is "usable" at the point for which the calculations have been made.

One object of the present invention, therefore, is to provide a hand-operated calculating device for determining satellite alerts.

A further object of the invention is to provide a satellite tracking calculator for predicting the location of an earth satellite with respect to a given geographical position without the aid of computers and without the necessity for mental computations.

Another object of the present invention is to provide a calculator which will enable a determination to be made at any point on the earth's surface of the time of closest approach of a particular communication satellite.

An additional object of the present invention is to provide a satellite tracking calculator which is simple in design, inexpensive to manufacture and capable of yielding the desired information with a high degree of accuracy.

Other objects, advantages, and novel features of the invention will become apparent from the following detailed description of the invention when considered in conjunction with the accompanying drawings.

DESCRIPTION OF THE PREFERRED EMBODIMENT

Figure 1:
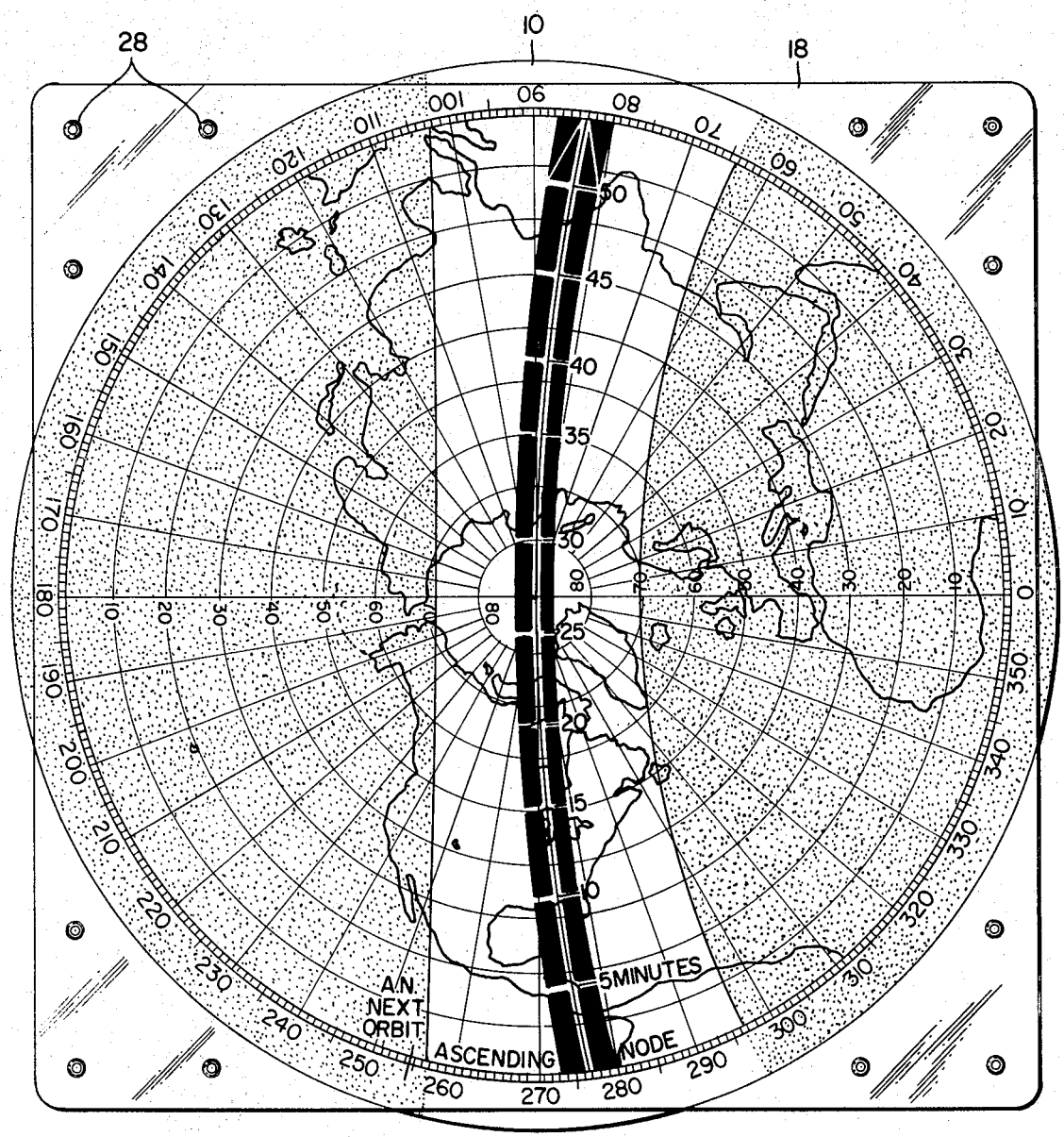
FIG. 1 is a plan view of one face of a satellite tracking calculator constructed in accordance with a preferred embodiment of the present invention, and usable by personnel located at a station or on a vehicle in the northern hemisphere.

The satellite tracking calculator illustrated in the drawings is a two-sided hand-operated instrument one side or face of which is usable by an individual located in the northern hemisphere and the opposite side of which is correspondingly usable by personnel at points in the southern hemisphere. Considering first that portion of the invention device shown in FIG. 1, there is illustrated a disc 10 of circular outline and composed of some opaque material such as cardboard or plastic. This disc 10 is also shown separately in FIG. 4 of the drawings.

Figure 4:
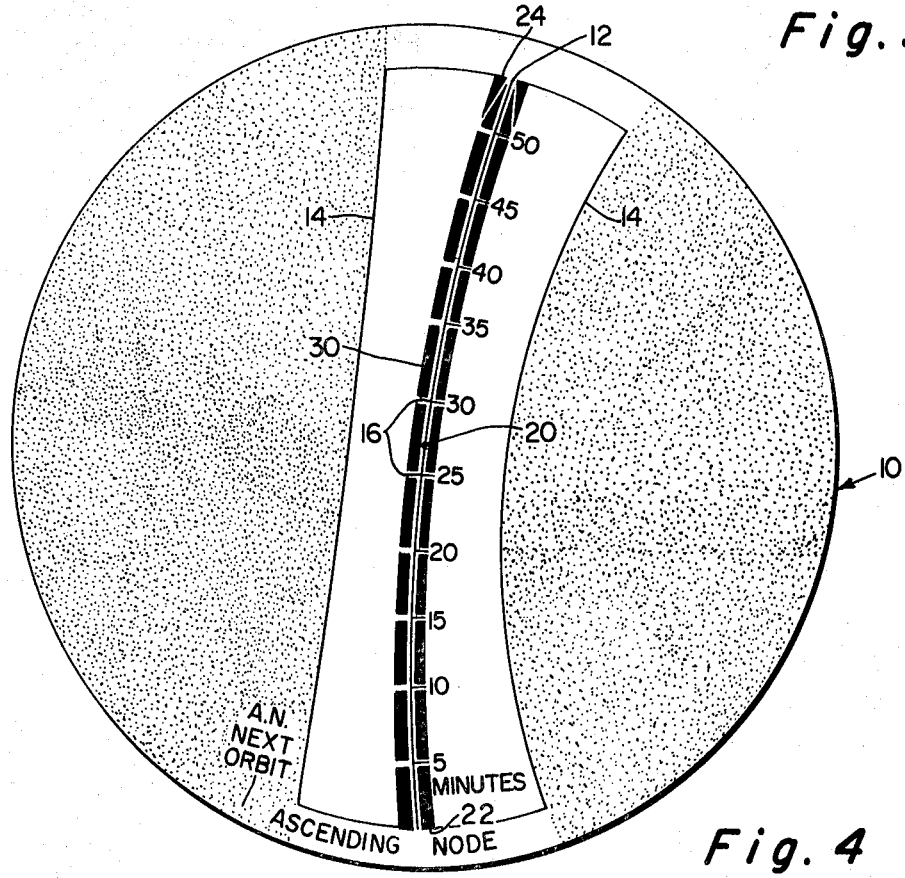
FIG. 4 is a view of the rotatable disc of the calculator of FIG. 1, upon which a nominal communications satellite ground track and associated coverage band or swath has been imprinted.
Figure 5:
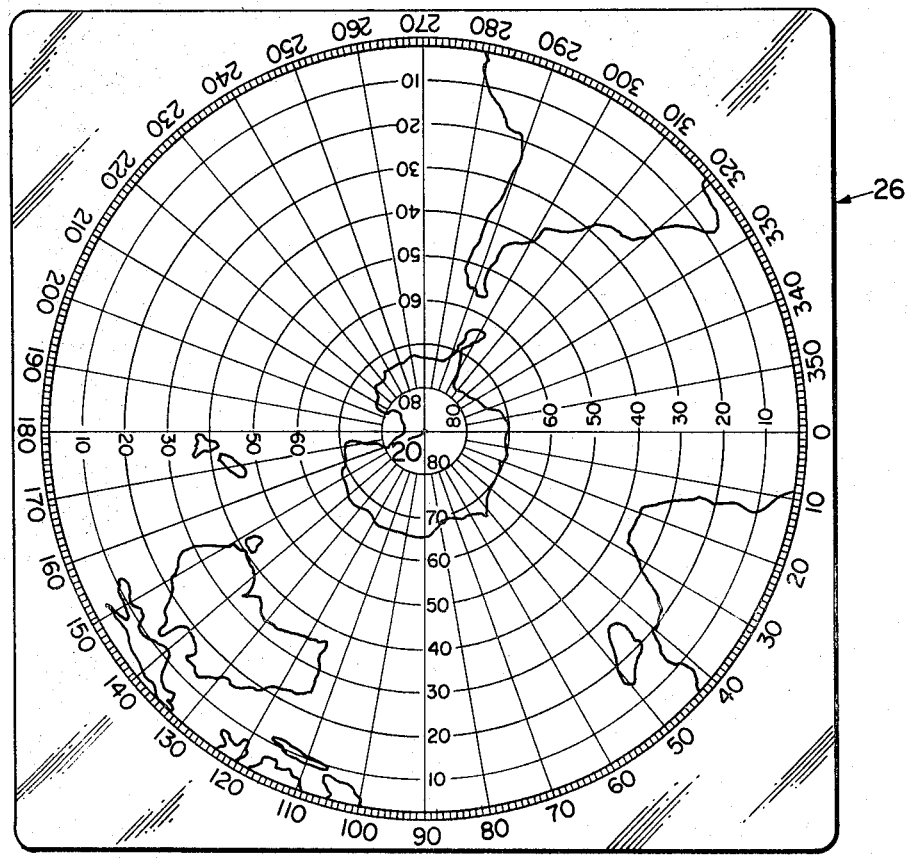
FIG. 5 is a view of the transparent cover of the calculator of FIG. 2, depicting an azimuthal equidistant polar projection of the southern hemisphere.
Figure 6:
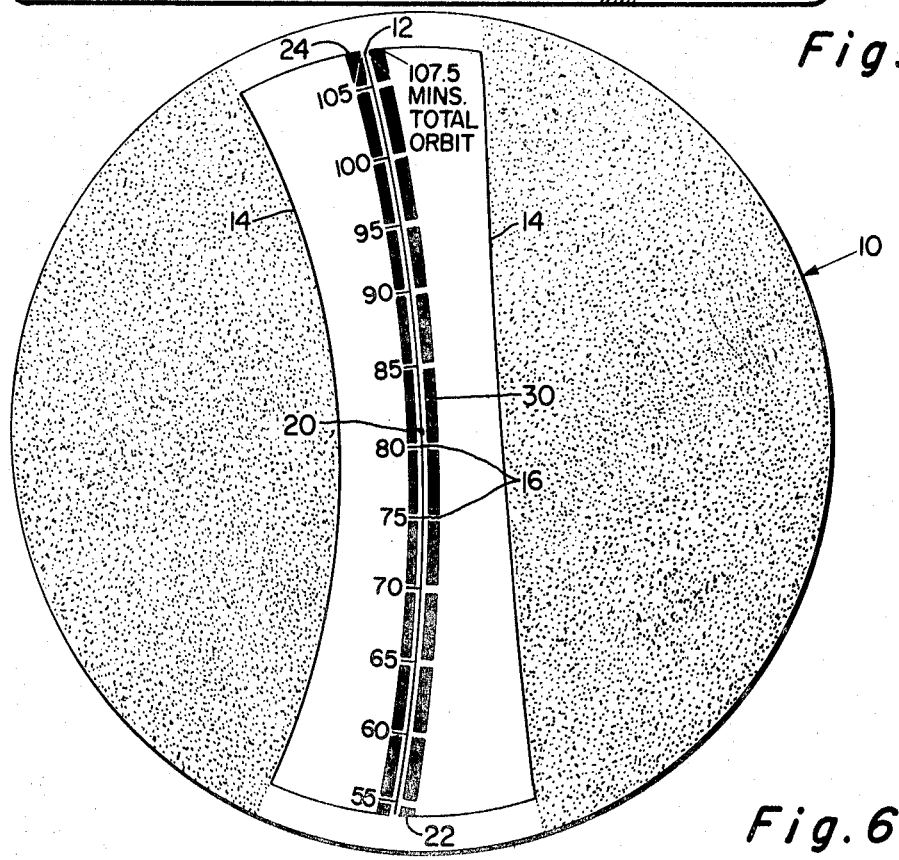
FIG. 6 is a view of the rotatable disc of the calculator of FIG. 2, showing the communications satellite ground track and associated band or swath usable beneath the transparent cover of FIG. 5.

Imprinted or in some other way marked upon that surface of disc 10 shown in FIGS. 1 and 4 is a curved line 12 representing the ground track in the northern hemisphere for an orbiting communications satellite. Lying on opposite sides of this line 12 is a pair of further lines 14, these lines 14 together designating the boundaries of a band or swath within which information transmitted from the satellite is receivable when the latter is at a time of closest approach to a particular receiving station.

As will be brought out in connection with a discussion of FIG. 1 of the drawings, the circular disc of FIG. 4 is additionally marked with indicia representative of the position along the ground track 12 of the satellite at regularly-spaced time intervals (5 minutes) following its crossing from the southern hemisphere to the northern hemisphere (i.e., the ascending node). These regularly-spaced intervals are designated by the reference character 16 (FIG. 4).

Figure 3:
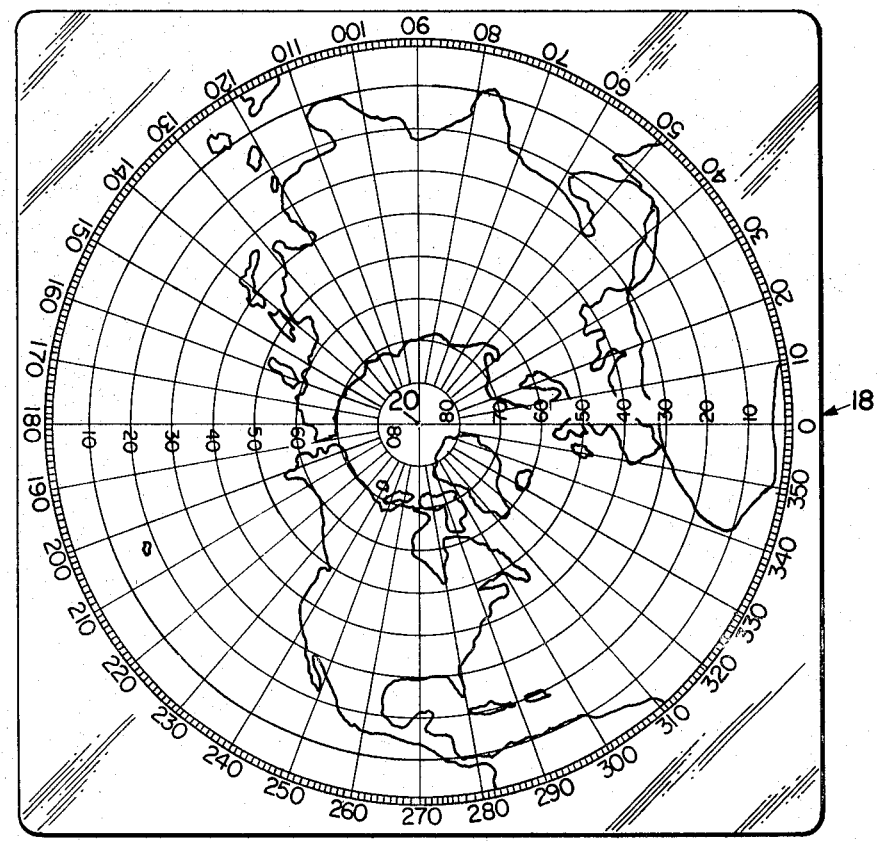
FIG. 3 is a plan view of the transparent cover of the calculator of FIG. 1, upon which an azimuthal equidistant polar projection has been imprinted.

FIG. 3 is a plan view of the transparent cover which overlies the rotatable disc 10 of FIG. 4. This cover, identified by the reference character 18, has outlined thereon an azimuthal equidistant polar projection of the northern hemisphere. The disc 10 of FIG. 4 is pivoted at 20 to rotate about a point coinciding with the north pole of the projection. As shown in FIG. 3, markings of latitude and longitude are also present upon the transparent cover 18 so as to facilitate the location by a user of the inventive device of his particular geographical position upon the earth's surface.

As shown in FIG. 1 of the drawings, the transparent cover 18 is of substantially rectangular configuration and so dimensioned that the peripheral sections of the rotatable disc 10 extend beyond the sides of the cover plate 18 when the two component members 10 and 18 are in assembled condition as shown in FIG. 1. This permits the disc 10 to be rotated about the pivot point 20 by an individual exerting pressure at any exposed surface of disc 10, while at the same time sufficient frictional engagement exists between the members 10 and 18 so that any selected relative position therebetween will be maintained until such time as a change in this position is intentionally brought about.

Inasmuch as the periphery of the equatorial projection marked on cover 18 represents the earth's equator, superimposition of the elements 10 and 18 will bring each terminus of the curved line 20 on disc 10 into positional coincidence with this equatorial representation, as shown in FIG. 1. In other words referring again to FIG. 4, the terminal portion 22 of line 12 represents the satellite's ascending node, while the remaining terminal portion of line 12 represents the point at which the satellite crosses from the northern to the southern hemisphere. For a satellite having an orbiting period of 107.5 minutes, the time of traversal between the points 22 and 24 in FIG. 4 is approximately 53.75 minutes.

Figure 2:
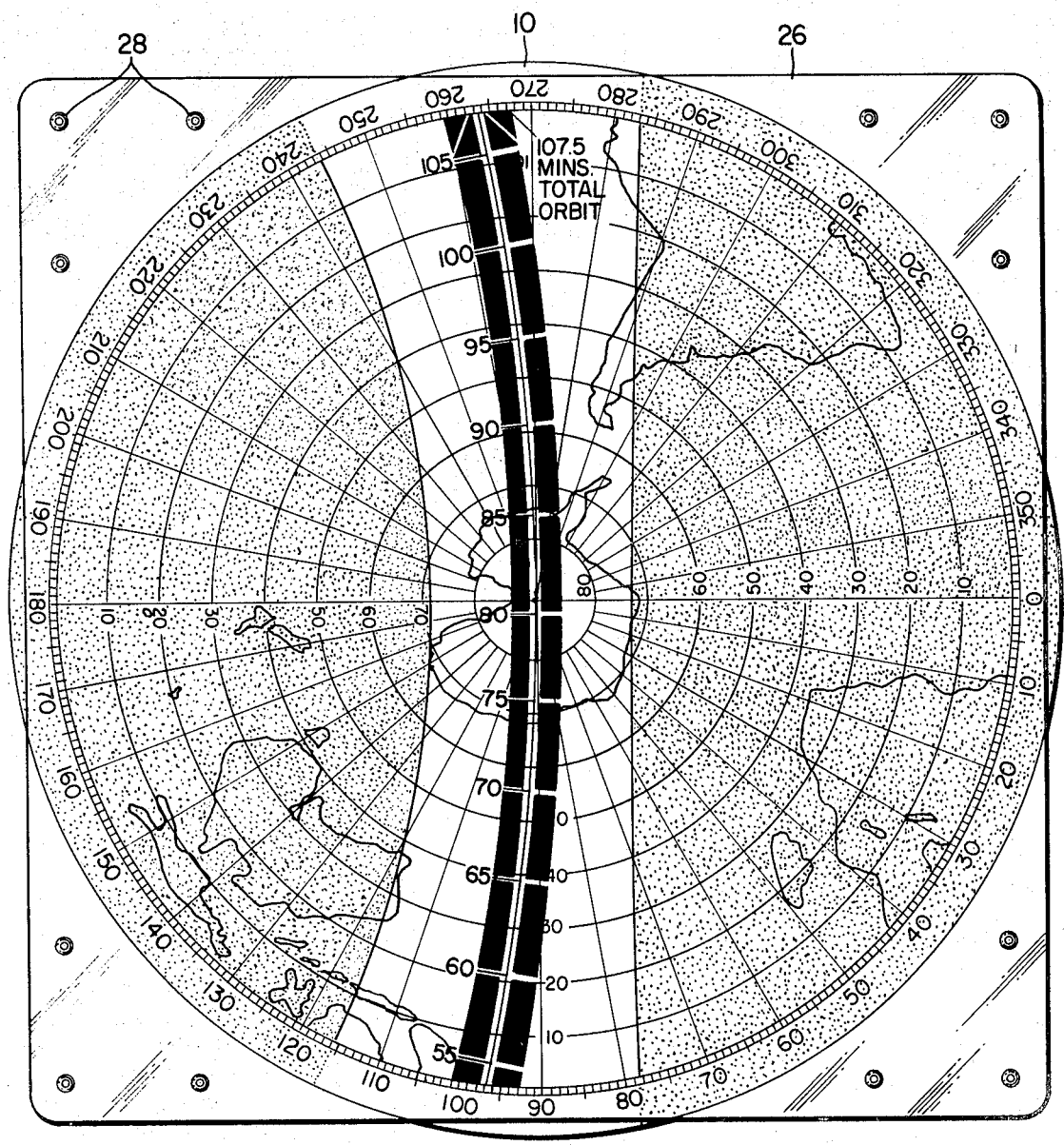
FIG. 2 is a plan view of the opposite face of the tracking calculator of FIG. 1, usable by personnel located at a station or on a vehicle in the southern hemisphere.

The above description of FIG. 1 applies in every respect to FIG. 2 except that the indicia marked upon the transparent cover 26 represents the southern rather than the northern hemisphere, and that the satellite ground track is shifted due to nodal precession of the satellite. Except for the difference in markings, the transparent cover 26 of FIG. 2 is identical to the cover 18, and the point 20 is common to the axis of the respective polar projections as well as constituting the pivot point about which the disc 10 rotates.

A plurality of rivets (or other fastening means) 28 are employed at the four corners of the respective covers 18 and 26 to secure these members together in a unitary assembly, in effect "sandwiching" the rotatable disc 10 therebetween.

An individual employing the calculating device of the present invention requires only knowledge of the satellite nodal period and westward motion of its subtrack in order to ascertain the future time, position and areas covered by the satellite. Consequently, an ephemeris (or table) of times of south-to-north equatorial longitudes (ascending nodes) for each orbiting satellite several months in advance is compiled and disseminated to each potential user. In addition, messages containing the above information are transmitted periodically in the event that any user requires it on short notice. With this data, the user may readily construct his own ephemeris.

A representative message thus transmitted consists of a single line containing seven fields of information, with each field separated by a period except the last, which is terminated by two apostrophe marks. The field structure is as follows:

| Field | Length of field (digits) | Significance of field |
| --- | --- | --- |
| 1 | 2 | Satellite I.D. number. |
| 2 | 3 | Day of year (0–365). |
| 3 | 2 | Year. |
| 4 | 6 | Time (T) of equatorial crossing of the specified (south-to-north) satellite on the day specified in minutes (4 digits left-to-right) and hundredths of a minute (last 2 digits on the right). |
| 5 | 6 | Longitude ($\lambda$) at equatorial crossing (ascending node) associated with the time (T) specified in field 4. The longitude is in degrees (3 digits left to right) and hundredths of a degree (2 digits). The direction is from Greenwich (1 digit) and is always east (i.e., 0–360° E). |
| 6 | 6 | Nodal period (NP) or time between the successive south-to-north equatorial crossings by a satellite in minutes (3 digits left-to-right) and thousandths of a minute (3 digits). |
| 7 | 5 | Westward motion (WM) of the subtrack of a satellite along the equator in degrees per nodal period (2 digits, left-to-right) and thousandths of a degree (3 digits). The westward motion of the subtrack of a satellite includes the motion due to the earth plus the nodal precession of the plane of the satellite. |

Sample message:

08.199.66.006509.34191E.105350.26415″.

Interpretation of message

This sample message indicates that satellite 30080 will cross from the southern hemisphere to the northern hemisphere (i.e., the ascending node) at 341.91 degrees east of Greenwich at 0065.09 minutes ZULU on day 199 (July 18) 1966. By employing the device of the present invention, an individual can follow the path of the satellite around in its orbit at five-minute intervals for the full period. For instance, at 01 hour, 20 minutes (15 minutes after the crossing), the invention device indicates that satellite 30080 was approximately over the coordinates 337°E (23°W) longitude 50°N.

Example of ephemeris construction

An ephemeris can be constructed from the information given in the sample message as shown below:

Sample message:

08.199.66.006509.34191E.105350.26415″.

Day:
    199—1st time (T), 0065.09Z, ascending node, 341.91°E
        plus NP, 105.350, minus WM, 26.415,
    199—2nd time (T), 0170.440Z, 2nd ascending node, 315.495°E,
        plus NP, 105.350, minus WM, 26.415,
    199—3rd time (T), 275.790Z, 3rd ascending node, 289.080°E This process can be continued and a complete ephemeris can be constructed.

Note: Time (T) is time of nodal crossing (in minutes). NP=Nodal period. WM=Westward motion.

The method of operating the calculating device of the present invention is as follows:

(1) Determine the approximate coordinates of the user (latitude and longitude).

(2) Knowing the day of the year and the time of day, determine from the ephemeris the time of the next ascending node for the satellite and the corresponding longitude of the ascending node. (The ephemeris can also be constructed from the sample message described above.)

(3) Line up the ascending node (determined from the ephemeris) at the point marked "ASCENDING NODE" on the calculator. (Note: This point is on the northern hemisphere.)

(4) If the user's coordinates lie outside the satellite swath width (WHITE AREA), no navigable pass is possible. If the user's coordinates lie inside the black area, designated by the reference number 30 in the drawings, a navigable pass is questionable due to the overhead constraint. In either case, the user should consider this pass useless and use steps (1) through (3) for another pass or for a different satellite.

(5) The time of satellite closest approach may be approximated by:

(A) Drawing a perpendicular from the station coordinates to the ground track.

(B) Interpolating between the times given on the ground track.

(C) Adding the interpolated time to the time the satellite was at the last ascending node.

(D) This TCA approximation is good within ±1 minute if the time of the last node was taken from an ephemeris less than 15 days old.

(E) The rise time of the satellite is dependent on the satellite maximum elevation but is approximately eight minutes before TCA.

Calculation of TCA

An accurate determination for the time of closest approach (TCA) may be derived from the following formulas:

$$TCA = \frac{\theta}{n} + t_0$$

where $$\tan \theta = \frac{1}{\cos\left(\Delta\lambda + \frac{\omega_e \phi}{n}\right)} \left[\tan \phi - \frac{\omega_e}{n} \sin\left(\Delta\lambda + \frac{\omega_e \phi}{n}\right)\right]$$

$n = 360°/NP$
$NP = $ Nodal period
$t_0 = $ Time of last ascending node
$\phi = $ Station latitude
$\Omega = $ Longitude of last ascending node
$\lambda_0 = $ Station longitude
$\omega_e = $ Spin rate of earth $= 15.04°/hr$.
$\Delta\lambda = \Omega - \lambda_0$ The time of satellite closest approach may be approximated within one minute by:

(1) Drawing a perpendicular line from the user's coordinates to the ground track.

(2) Interpolating between the times given on the ground track.

(3) Adding the interpolated time to the time the satellite was at the last ascending node.

The latitude, longitude and associated time for the ground track is calculated by dividing up the nodal period into equal time increments and solving for the corresponding latitude from the following formula:

$$\text{Latitude} = \frac{360°}{NP} T_\Omega$$

where $T_\Omega$=time after the last ascending node (minutes)
NP=nodal period of the satellite (minutes)

$$\text{Longitude east} = \Omega - T_\Omega(\omega_e)$$

(Nodal precession is eliminated from this formula; however, this is taken into account in the westward motion of the subtrack of the satellite in the sample message.) where $\Omega$=longitude of the last ascending node
$\omega_e$=Spin rate of earth.

The swath width is calculated by the following formula:

Swath width (in degrees longitude) =

$$2.0 \left[ \sin^{-1} \left( \frac{\sin \theta/2}{\cos \phi} \right) \right]$$

where $\phi$=latitude of station
$\theta/2$=the geocentric angle between the satellite and the station when the station has an elevation angle at TCA equal to the maximum angle according to navigation criteria. This maximum elevation is called the overhead constraint and defines the inner boundaries of half the swath width; or the geocentric angle between the satellite and the station when the station has an elevation angle at TCA equal to the minimum angle according to navigation criteria. This minimum elevation is called the overhead constraint and defines the outer boundary of half the swath width.

$$\theta = \text{approximately } 2 \left[ \cos^{-1} \left( \frac{r \sin (90+\alpha)}{(r+h)} \right) - \alpha \right]$$

where $h$=satellite altitude above the earth's surface in n.m.
$r$=radius of earth in n.m.
$\alpha$=maximum elevation angle according to navigation criteria; or
$\alpha$=minimum elevation angle according to navigation criteria.

The invention device herein illustrated and described embodies a number of approximations in order to render it usable with satellites of varying orbital parameters. It is obvious that modifications therein may be made according to the specific needs of the users. For example accuracy can be improved by designing a device for each individual satellite, embodying its particular characteristics. Also, due to the eccentricity of actual satellite orbits, satellite passes which appear to be slightly inside the outer swath limit may be too low to track if the satellite is near perigee; on the other hand, passes slightly outside the outer swath limit may be successfully tracked if the satellite is near apogee.

The expressions "navigation satellite" and "communications satellite" as used interchangeably herein are deemed to cover all earth satellites orbited for, or usable in, a system for all-weather, world-wide navigation.

While the invention device has been set forth in conjunction with the obtaining of a navigational fix by a user at a point or station on the earth's surface, the principles upon which the concept is based can be applied to aiding system users in locating newly-launched satellites, examining potential satellite conflicts, generating back-up alerts for users, and as a training aid in explaining coverage problems wth polar satellites. Consequently, the invention device constitutes a very powerful and versatile tool for any satellite system.

Obviously many modifications and variations of the present invention are possible in the light of the above teachings. It is therefore to be understood that within the scope of the appended claims the invention may be practiced otherwise than as specifically described.

We claim:

1. A hand-operated calculating device for use by an individual at a station in the earth's northern hemisphere for determining satellite alerts, said device comprising:

an opaque disc of circular configuration having depicted thereon a representative satellite ground track for the northern hemisphere and an associated band essentially bisected by said ground track and indicative of that portion of the earth's surface in the northern hemisphere which lies within radio line-of-sight of said satellite;

a transparent cover overlying said disc, said cover having depicted thereon an azimuthal equidistant polar projection of the earth's northern hemisphere; and means pivotally securing the center of said circular disc to said transparent cover at the north pole location of said equidistant projection, whereby said disc may be manually rotated about said pivot with respect to said cover so as to align one terminus of said ground track with that particular azimuthal position on said cover at which it is known that a particular satellite will have an ascending node, such alignment thereby indicating to said individual whether or not the station at which he is located falls within said band and hence within radio line-of-sight of said satellite.

2. A hand-operated calculating device according to claim 1, in which said satellite ground track is divided into equal cumulative time increments totaling the period of passage of said satellite over the northern hemisphere, the time of closest approach of said satellite to said station being determined by drawing a perpendicular line from the location of said station on said cover to the ground track on said disc, interpolating between the times respectively denoted by the two increments closest to the intersection between said ground track and said perpendicular line, and then adding the interpolated time to the time the satellite is at the ascending node.

3. A hand-operated calculating device for use by an individual to determine satellite alerts, said device comprising:

an opaque disc of circular configuration having depicted on one side thereof a representative earth satellite ground track for the northern hemisphere and an associated band essentially bisected by said ground track and indicative of that portion of the earth's surface in the northern hemisphere which lies within radio line-of-sight of said satellite;

a first transparent cover overlying the said one side of said disc, said first cover having depicted thereon an azimuthal equidistant polar projection of the earth's northern hemisphere;

said opaque disc having depicted on the remaining side thereof the ground track for said representative earth satellite for the southern hemisphere, together with an associated band essentially bisected by said ground track and indicative of that portion of the earth's surface in the southern hemisphere which lies within radio line-of-sight of said satellite;

a second transparent cover overlying the said remaining side of said disc, said second cover having depicted thereon an azimuthal equidistant polar projection of the earth's southern hemisphere;

means pivotally attaching the center of said disc to both said covers at the north and south pole locations of the respective equidistant projections; and means securing together both said covers so that said disc is "sandwiched" therebetween but rotatable with respect thereto, whereby said disc may be manually rotated about the point of its pivotal attachment with respect to said covers so as to align one terminus of the ground track on the said one side thereof with that particular azimuthal position on said first cover at which it is known that a particular satellite will have an ascending node, such alignment indicating to said individual whether or not his location on the earth's surface falls within the band on either side of said disc and hence within radio line-of-sight of said satellite.

4. A hand-operated calculating device according to claim 3, in which the said satellite ground track on both sides of said disc is divided into equal cumulative time increments totaling for both sides of said disc one complete orbital passage of said satellite, the time of closest approach of said satellite to any point on the earth's surface being derived from the intersection of said ground track with a line drawn perpendicular thereto from said point as located on either one of said covers, the said intersection time thus derived from the said increments being added to the time the satellite is at the ascending node.

5. A hand-operated calculating device for use by an individual located at a station on the earth's surface for determining satellite alerts, said device comprising:

a sheet-like member of opaque material having depicted on one surface thereof a representative satellite ground track and an associated region essentially bisected by said ground track and indicative of a portion of the earth's surface which lies within radio line-of-sight of said satellite; and a transparent cover overlying that surface of said member on which said ground track is depicted, said cover having inscribed thereon a projection of at least a portion of the earth's surface which includes a representation of at least a portion of the equator;

said member being adapted for manual activation with respect to said cover so as to permit an alignment of one terminus of said satellite ground track as shown on said member with that particular azimuthal position on the equator represented on said cover at which it is known that a particular satellite will cross the equator;

such alignment thereby indicating to said individual whether or not the station at which he is located falls within said region and hence within radio line-of-sight of said satellite.

References Cited

UNITED STATES PATENTS 3,133,352  5/1964  Jasperson _____ 33—1
3,241,252  3/1966  Baalson _____ 35—46

LEONARD FORMAN, Primary Examiner

S. L. STEPHAN, Assistant Examiner

U.S. Cl. X.R.

35—74; 235—61